(12) United States Patent
Chiba

(10) Patent No.: US 9,620,126 B2
(45) Date of Patent: Apr. 11, 2017

(54) ELECTRONIC DEVICE, CONTROL METHOD, AND CONTROL PROGRAM

(71) Applicant: KYOCERA Corporation, Kyoto-shi, Kyoto (JP)

(72) Inventor: Atsuo Chiba, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 14/424,693

(22) PCT Filed: Aug. 28, 2013

(86) PCT No.: PCT/JP2013/073040
§ 371 (c)(1),
(2) Date: Feb. 27, 2015

(87) PCT Pub. No.: WO2014/034733
PCT Pub. Date: Mar. 6, 2014

(65) Prior Publication Data
US 2015/0255071 A1 Sep. 10, 2015

(30) Foreign Application Priority Data

Aug. 28, 2012 (JP) .................. 2012-187915

(51) Int. Cl.
*G10L 21/00* (2013.01)
*G10L 17/22* (2013.01)
(Continued)

(52) U.S. Cl.
CPC ......... *G10L 17/22* (2013.01); *H04M 1/72522* (2013.01); *H04R 1/08* (2013.01); *G10L 2015/228* (2013.01); *H04M 1/72552* (2013.01); *H04M 2250/12* (2013.01); *H04M 2250/74* (2013.01); *H04R 2499/11* (2013.01)

(58) Field of Classification Search
USPC .................................................. 704/270–278
See application file for complete search history.

(56) References Cited

U.S. PATENT DOCUMENTS 6,339,706 B1 * 1/2002 Tillgren ................ G08C 17/02
455/419
7,010,332 B1 * 3/2006 Irvin ...................... H04M 1/05
379/106.02

(Continued)

FOREIGN PATENT DOCUMENTS

JP  2000-134289 A   5/2000
JP  2000-201205 A   7/2000

(Continued)

OTHER PUBLICATIONS

International Search Report Mailed Oct. 1, 2013 in corresponding International Application No. PCT/JP2013/073040.

(Continued)

*Primary Examiner* — Abul Azad
(74) *Attorney, Agent, or Firm* — Hauptman Ham, LLP

(57) ABSTRACT

According to one of aspects, an electronic device includes a sound input module and a controller. The controller is configured to control a voice input through the sound input module to be activated when detecting occurrence of an event to be notified to a user.

7 Claims, 7 Drawing Sheets

(51) Int. Cl.
*H04M 1/725* (2006.01)
*H04R 1/08* (2006.01)
*G10L 15/22* (2006.01)

(56) References Cited

U.S. PATENT DOCUMENTS

| | | | |
|---|---|---|---|
| 8,650,036 B2* | 2/2014 | Han | G10L 15/22 704/275 |
| 8,731,912 B1* | 5/2014 | Tickner | H04M 19/04 704/208 |
| 2007/0075965 A1 | 4/2007 | Huppi et al. | |
| 2007/0135187 A1* | 6/2007 | Kreiner | H04M 1/271 455/575.2 |
| 2008/0165937 A1* | 7/2008 | Moore | G10L 17/22 379/88.04 |
| 2009/0286514 A1* | 11/2009 | Lichorowic | G10L 13/00 455/412.2 |
| 2010/0105436 A1 | 4/2010 | Yoshino | |
| 2011/0034208 A1* | 2/2011 | Gu | G06F 3/04883 455/550.1 |
| 2011/0105190 A1* | 5/2011 | Cha | G06F 17/276 455/566 |
| 2013/0065648 A1* | 3/2013 | Kim | G06F 21/31 455/566 |
| 2013/0072251 A1* | 3/2013 | Kim | H04M 1/7253 455/550.1 |
| 2013/0080178 A1* | 3/2013 | Kang | G06F 3/167 704/275 |
| 2013/0082945 A1* | 4/2013 | Jo | H04M 1/67 345/173 |
| 2013/0085761 A1* | 4/2013 | Bringert | G06F 3/167 704/275 |
| 2013/0141516 A1* | 6/2013 | Baldwin | H04N 7/152 348/14.03 |
| 2013/0215007 A1* | 8/2013 | Hung | G06F 1/1677 345/156 |

FOREIGN PATENT DOCUMENTS

| | | |
|---|---|---|
| JP | 2002-125013 A | 4/2002 |
| JP | 2008-244690 A | 10/2008 |
| JP | 2010-507870 A | 3/2010 |
| JP | 2011-87230 A | 4/2011 |
| JP | 2011-133976 A | 7/2011 |
| JP | 2011-526099 A | 9/2011 |
| JP | 2011-250152 A | 12/2011 |
| JP | 2012-175625 A | 9/2012 |

OTHER PUBLICATIONS

Yoshiyuki Hashimoto, Easy Guide for iPhone Siri navigated with your voice, Shuwa system Co. Ltd., Jul. 5, 2012, first edition / first copy, pp. 43-70, 100-109.
Office Action in JP Application No. 2012-187915, mailed May 17, 2016, for which an explanation of relevance is attached.
Office Action in JP Application No. 2012-187915, mailed Nov. 1, 2016, for which an explanation of relevance is attached.

* cited by examiner

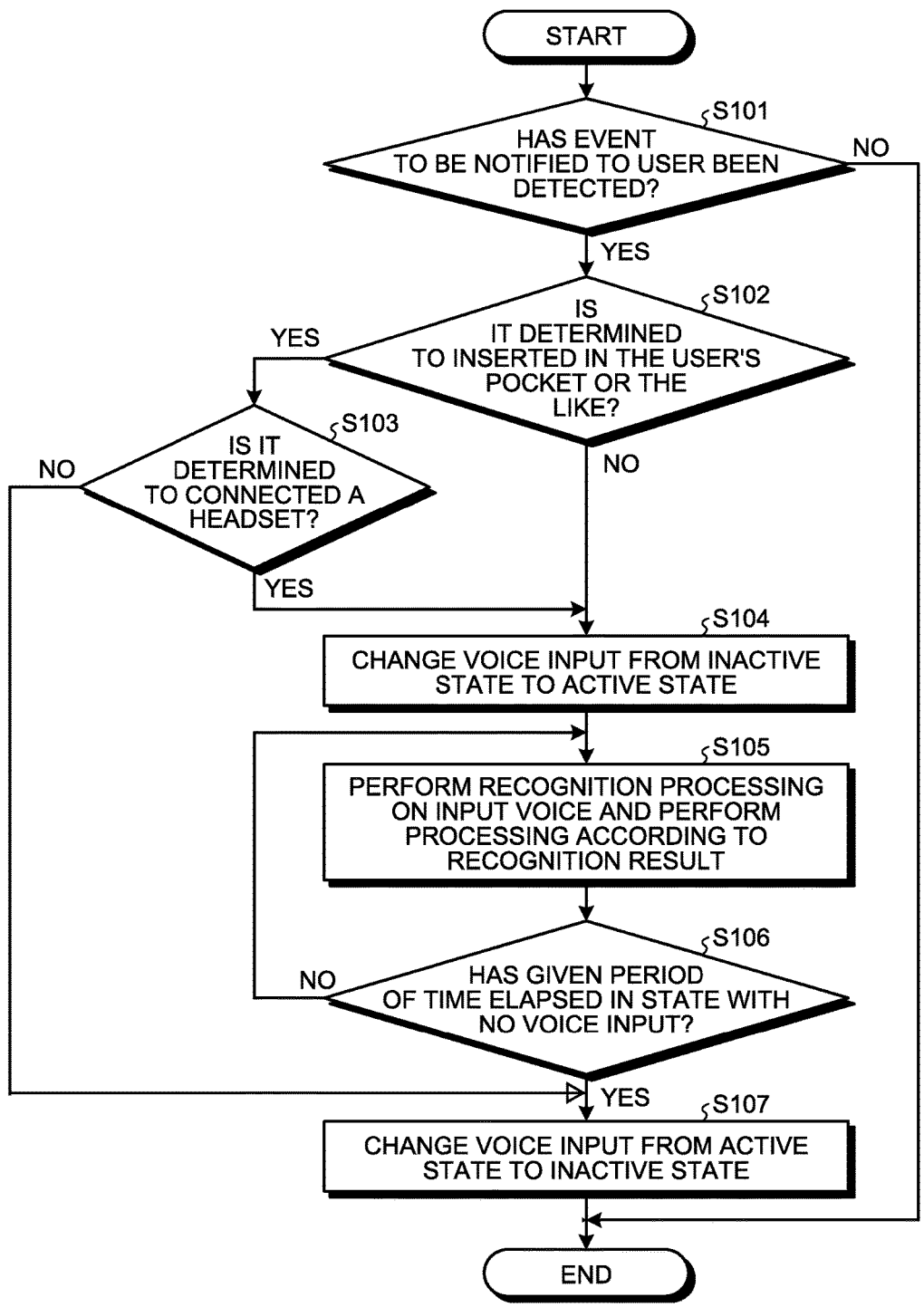

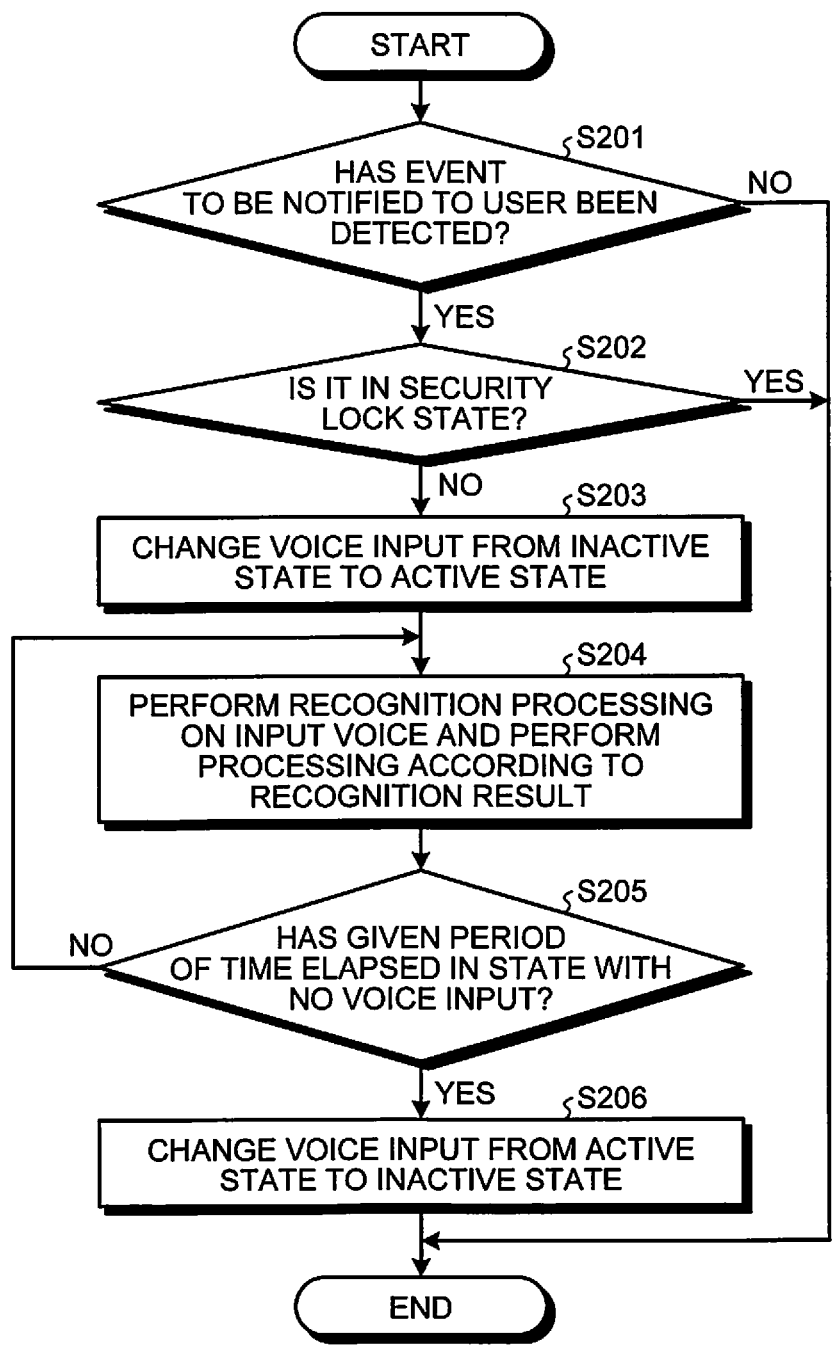

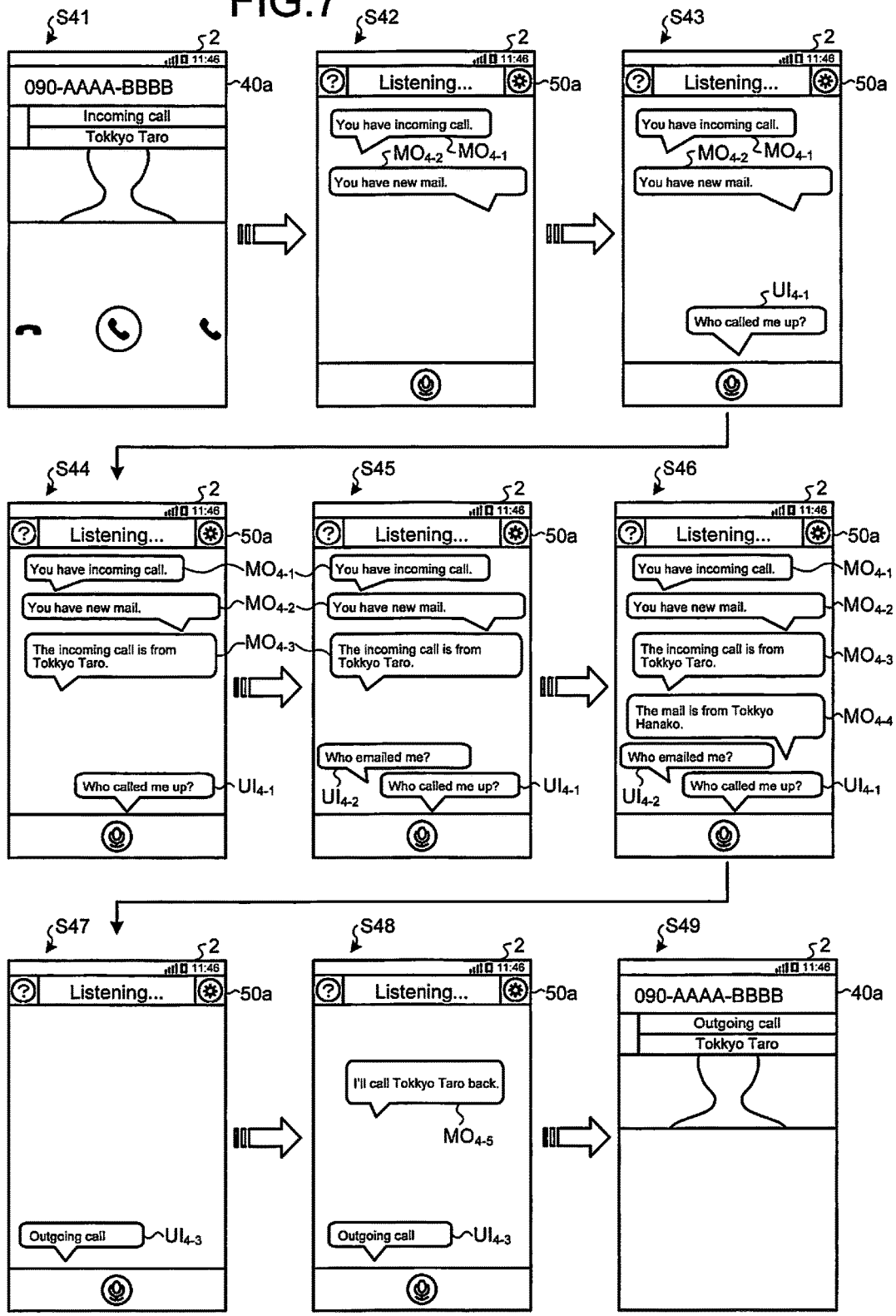

ELECTRONIC DEVICE, CONTROL METHOD, AND CONTROL PROGRAM

CROSS-REFERENCE TO RELATED APPLICATION

This application is a National Stage of PCT international Application Ser. No. PCT/JP2013/073040 filed on Aug. 28, 2013 which designates the United States, incorporated herein by reference, and which is based upon and claims the benefit of priority from Japanese Patent Application No. 2012-187915 filed on Aug. 28, 2012, the entire contents of which are incorporated herein by reference.

FIELD

The present application relates to an electronic device, a control method, and a control program.

BACKGROUND

Some electronic devices such as a mobile phone or a smartphone have a function of notifying a user of an event such as an incoming call and mail reception. For example, Patent Literature 1 discloses a mobile phone that periodically flashes an LED when a missed call occurs.

CITATION LIST

Patent Literature

Patent Literature 1: JP-A-2011-250152

Technical Problem

Incidentally, for example, when a user performs an operation related to an event occurring in a mobile phone or a smartphone such as a missed call or mail reception, he/she generally performs a manual operation such as an operation performed on a button or an operation performed by a touch gesture.

For the foregoing reasons, there is a need for an electronic device, a control method, and a control program that improve convenience of the user when he/she performs an operation according to various events.

SUMMARY

According to one of aspects, an electronic device includes: a sound input module; and a controller configured to control a voice input through the sound input module to be activated when detecting occurrence of an event to be notified to a user.

According to another one of aspects, a control method is for controlling an electronic device with a sound input module. The control method includes: detecting occurrence of an event to be notified to a user; and controlling a voice input through the sound input module to be activated when the occurrence of the event is detected.

According to another one of aspects, a control program causes an electronic device with a sound input module to execute: detecting occurrence of an event to be notified to a user; and controlling a voice input through the sound input module to be activated when the occurrence of the event is detected.

BRIEF DESCRIPTION OF DRAWINGS

FIG. 5 is a diagram of one of examples of a processing procedure for implementing the control based on a function provided by a control program according to the first embodiment.

FIG. 6 is a diagram of one of examples of a processing procedure for implementing the control based on a function provided by a control program according to a second embodiment.

FIG. 7 is a diagram of one of examples of control performed by the smartphone when a missed call occurs immediately after reception of a mail.

DESCRIPTION OF EMBODIMENTS

Exemplary embodiments for implementing the electronic device, the control method, and the control program according to the present application will be explained in detail below with reference to the accompanying drawings. A smartphone will be explained below as one of examples of the electronic device.

First Embodiment

Figure 1:
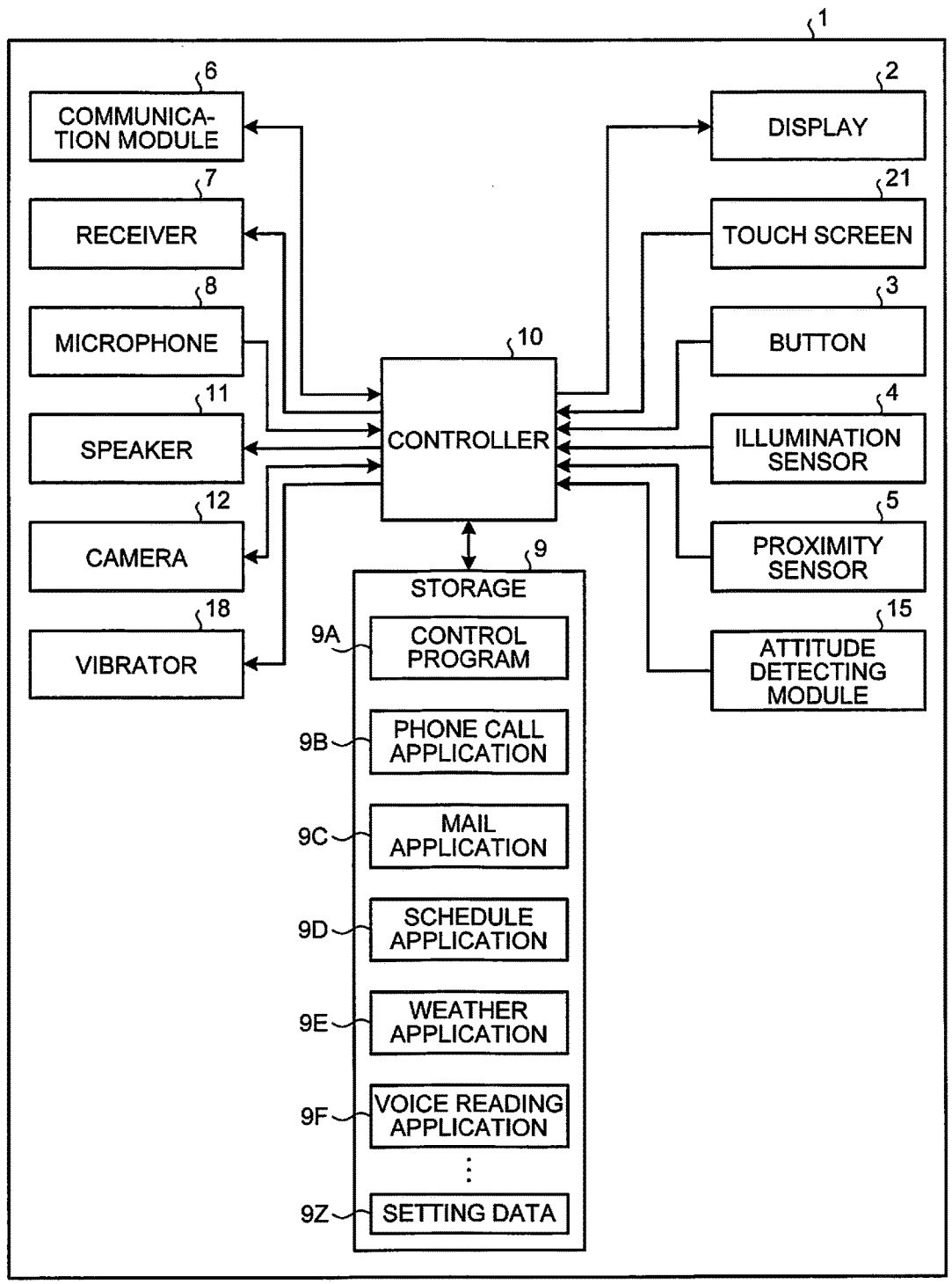
FIG. 1 is a block diagram of a smartphone according to a first embodiment.

A functional configuration of a smartphone 1 according to a first embodiment will be explained with reference to FIG. 1. FIG. 1 is a block diagram of the smartphone according to the first embodiment. As illustrated in FIG. 1, the smartphone 1 includes a display 2, a button 3, an illumination sensor 4, a proximity sensor 5, a communication module 6, a receiver 7, a microphone 8, a storage 9, a controller 10, a speaker 11, a camera 12, an attitude detecting module 15, a vibrator 18, and a touch screen 21.

The display 2 includes a display device such as an LCD (Liquid Crystal Display), an OELD (Organic Electro-Luminescence Display), or an IELD (Inorganic Electro-Luminescence Display). The display 2 displays text, images, symbols, graphics, and the like.

The button 3 receives an operation input from a user. The number of button 3 may be single or plural.

The illumination sensor 4 detects illumination of the ambient light of the smartphone 1. The illumination indicates intensity, lightness, or brightness of light. The illumination sensor 4 is used, for example, to adjust the brightness of the display 2.

The proximity sensor 5 detects the presence of a nearby object without any physical contact. The proximity sensor 5 detects the presence of the object based on changes in a magnetic field or changes in a return time of a reflected wave of an ultrasonic wave, etc. The proximity sensor 5 detects that, for example, the display 2 is brought close to someone's face. The illumination sensor 4 and the proximity sensor 5 may be configured as one sensor. The illumination sensor 4 may be used as the proximity sensor 5.

The communication module 6 performs communication via a wireless system. A wireless communication standard supported by the communication module 6 includes, for example, a cellular-phone communication standard such as 2G, 3G, and 4G, and a short-distance wireless communication standard. Examples of the cellular-phone communication standard include, but are not limited to, LTE (Long Term Evolution), W-CDMA (Wideband Code Division Multiple Access), WiMAX (Worldwide Interoperability for Microwave Access), CDMA 2000, PDC (Personal Digital Cellular), GSM (Global System for Mobile Communications), and PHS (Personal Handy-phone System). Examples of the short-distance wireless communication standard include, but are not limited to, IEEE 802.11, Bluetooth, IrDA (Infrared Data Association), NFC (Near Field Communication), and WPAN (Wireless Personal Area Network). Examples of the WPAN communication standard include, but are not limited to, ZigBee. The communication module 6 may support one or more of the communication standards.

The communication module 6 receives a radio signal of a predetermined frequency band from a GPS satellite, performs demodulation processing on the received radio signal, and transmits the processed signal to the processing to the controller 10. The smartphone 1 may provide a discrete communication module independent from the communication module 6 by separating a communication function with the GPS satellite from the communication module 6.

The receiver 7 includes a sound output module. The receiver 7 outputs a sound signal transmitted from the controller 10 as a sound. The receiver 7 is used, for example, to output a voice of a call partner on the phone. The microphone 8 includes a sound input module. The microphone 8 converts the voice of the user or the like to a sound signal and transmits the converted signal to the controller 10.

The storage 9 stores programs and data. The storage 9 is used also as a work area for temporarily storing a processing result of the controller 10. The storage 9 includes at least one of, for example, an optical disc such as CD, DVD, and Blu-ray, a magneto-optical disc, a magnetic storage medium, a memory card, and solid-state storage medium; however, configuration of the storage 9 is not limited thereto. The storage 9 may include a combination of a portable storage medium such as a memory card, an optical disc, or a magneto-optical disc with a reader of the storage medium. The storage 9 may include a storage device used as a temporary storage area such as RAM (Random Access Memory).

The program stored in the storage 9 includes an application executed in the foreground or in the background and a control program for assisting an operation of the application. The application executed in the foreground displays, for example, a screen on the display 2. The control program includes, for example, an OS. The application and the control program may be installed in the storage 9 through wireless communication by the communication module 6 or through a non-transitory storage medium.

The storage 9 stores, for example, a control program 9A, a phone call application 9B, a mail application 9C, a schedule application 9D, a weather application 9E, a voice reading application 9F, and setting data 9Z.

The control program 9A provides a function related to the various controls for operating the smartphone 1. The control program 9A provides a function of outputting an alarm sound from the speaker 11, for example, when it reaches the time at which the alarm is sounded. The control program 9A provides a function of displaying, for example, a screen representing that the alarm is sounding on the display 2. The control program 9A provides a function of monitoring, for example, a remaining battery level and notifying the user that the remaining battery level reaches a predetermined value. The control program 9A provides a function of notifying the user of start and end of charge. The control program 9A provides a function of notifying the user of detection of an access point in wireless LAN. The control program 9A provides a function of performing area detection based on a radio signal from the GPS satellite.

Furthermore, the control program 9A includes a function of causing the controller 10 to execute the processing of controlling the voice input by the user through the microphone 8 as a sound input module, to be activated when detecting occurrence of an event to be notified to the user. Examples of the event to be notified to the user may include, but are not limited to, a missed call on the phone, reception of a mail, alarm sounding, reaching a predetermined value of the remaining battery level, start or end of charge, detection of an access point in wireless LAN, and area detection.

The control program 9A further includes a function of performing recognition processing on a voice input by the user through the microphone 8 and of causing the controller 10 to execute processing according to a recognition result.

The control program 9A may include a function of informing the user of, for example, reception of an incoming call, reception of a mail, a low remaining battery level, start or end of charge, detection of access point in a wireless LAN, and detection of an area. Examples of a method of informing the user thereof include, but are not limited to, a method of lighting a light emitting module such as an LED, a method of outputting a sound, a method of displaying an image such as a balloon in which a content to be given to the user is described on the display 2, a method of outputting a voice corresponding to the content to be given to the user by the voice reading application 9F, etc.

The control program 9A may include a function of displaying a screen representing that the voice input by the user is activated, a function of displaying an image corresponding to the content of the processing executed according to the result of recognition processing, and a function of outputting a voice corresponding to the content of the processing executed according to the result of recognition processing.

The control program 9A may be used in combination with a function provided by other program stored in the storage 9.

The phone call application 9B provides a phone call function for telephone calls through wireless communication. The mail application 9C provides an electronic mail function for composition, transmission, reception, display, and the like of electronic mails. The schedule application 9D provides a function for register, management, and the like of schedule. The weather application 9E provides a function for providing information related to weather, etc to the user. The voice reading application 9F provides a function of reading aloud. The voice reading application 9F generates voice data corresponding to, for example, information to be read aloud and outputs the generated voice from the speaker 11.

Each of the mail application 9C, the schedule application 9D, and the weather application 9E has a function of exchanging various pieces of information including latest information in synchronization with the corresponding server in order to implement the respective functions. The smartphone 1 may store mail data, schedule data, and weather data in the storage 9 instead of the mail application 9C, the schedule application 9D, and the weather application 9E. In this case, the control program 9A provides a function of acquiring latest data in synchronization with a server for managing the mail data, the schedule data, and the weather data, and of storing the acquired data in the storage 9.

The setting data 9Z includes information on various settings and processing related to the operation of the smartphone 1. The setting data 9Z includes setting of a timeout time at which a voice input by the user through the microphone 8 is changed from the active state to an inactive state, for example, when it is detected that an event to be notified to the user occurs. The setting data 9Z includes, for example, setting related to a reading voice by the voice reading application 9F. The setting includes setting or the like as to whether to output a reading voice, for example, indicating reception of an incoming call, indicating reception of a mail, indicating a low remaining battery level, indicating start or end of charge, indicating detection of access point in the wireless LAN, and indicating detection of an area, respectively. The setting data 9Z may include a sound file corresponding to an alarm sound, a sound at pop-up display, a ring tone, a mail reception sound, and the like. The setting data 9Z may include contact data including telephone numbers, names, mail addresses, and the like.

FIG. 1 exemplarily depicts applications stored in the storage 9. For example, a browser application, a navigate application, a music player application, a moving image reproduction application, a calculator application, and the like may further be stored in the storage 9.

The controller 10 includes a processing module. Examples of the processing module include, but are not limited to, a CPU (Central Processing Unit), an SoC (System-on-a-chip), an MCU (Micro Control Unit), and an FPGA (Field-Programmable Gate Array). The controller 10 integrally controls the operations of the smartphone 1 to implement the various functions.

Specifically, the controller 10 executes instructions included in a program stored in the storage 9 while referring to data stored in the storage 9 as necessary. The controller 10 then controls function modules according to the data and the instructions to thereby implement the various functions. Examples of the function modules include, but are not limited to, the display 2, the communication module 6, the receiver 7, and the speaker 11. The controller 10 can change the control according to a detection result of a detector. Examples of the detector include, but are not limited to, the button 3, the illumination sensor 4, the proximity sensor 5, the microphone 8, the camera 12, the attitude detecting module 15, and the touch screen 21.

The controller 10 executes, for example, the control program 9A to thereby implement the processing for controlling the voice input by the user through the microphone 8 being the sound input module to be activated, when detecting occurrence of an event to be notified to the user. Moreover, the controller 10 executes the control program 9A to thereby perform the recognition processing of user's voice input through the microphone 8 and execute processing according to the result of the recognition processing. For example, when a missed call occurs on the phone, the controller 10 activates the voice input by the user through the microphone 8. Subsequently, the controller 10 performs the recognition processing on the voice input through the microphone 8. For example, when it is recognized that the input voice is an inquire about a caller of the missed call as a result of voice recognition processing, the controller 10 acquires information for the name of the caller corresponding to the missed call. The controller 10 then executes the voice reading application 9F, to thereby output a reading voice corresponding to the name of the caller of the missed call from the speaker 11.

The speaker 11 includes a sound output module. The speaker 11 outputs a sound signal transmitted from the controller 10 as a sound. The speaker 11 is used to output, for example, an alarm sound, a sound at pop-up display, a ring tone, a mail reception sound, and music. Either one of the receiver 7 or the speaker 11 may have the other function.

The camera 12 converts a photographed image to an electric signal. The camera 12 includes, for example, an in-camera for photographing an object facing the display 2 and an out-camera for photographing an object facing the opposite side of the display 2.

The attitude detecting module 15 detects an attitude of the smartphone 1. The attitude detecting module 15 includes at least one of an acceleration sensor, a direction sensor, and a gyroscope in order to detect the attitude.

The vibrator 18 vibrates part or whole of the smartphone 1. The vibrator 18 includes, for example, a piezoelectric element or an eccentric motor in order to generate vibration. The vibration generated by the vibrator 18 is used to inform the user of the various events such as an incoming call.

The touch screen 21 detects a touch on the touch screen 21. The controller 10 (smartphone 1) detects various operations (gestures) performed on the touch screen 21 using a finger, a stylus, a touch pen, or the like (hereinafter, simply called "finger") based on the touch detected through the touch screen 21. For example, the touch screen 21 includes a touch sensor. The touch sensor detects a touch of the finger on the touch screen 21 together with a position of the touched location on the touch screen 21, and notifies the controller 10 of the detection result. Examples of the various operations (gestures) detected by the controller 10 through the touch screen 21 include, but are not limited to, touch, long touch, release, swipe, tap, double tap, long tap, drag, flick, pinch in, and pinch out. The detection method of the touch screen 21 may be any detection method of a capacitive type detection method, a resistive type detection method, a surface acoustic wave type (or ultrasonic type) detection method, an infrared type detection method, an electromagnetic induction type detection method, and a load sensing type detection method. As illustrated in FIG. 1, the display 2 and the touch screen 21 are functionally separated from each other, but may be integrated physically as a touch screen display.

The functional configuration of the smartphone 1 is exemplarily illustrated in FIG. 1, and may be modified as required within a scope that does not depart from the gist of the present invention. For example, the voice reading application 9F does not have to be stored in the storage 9.

The control executed by the smartphone 1 in the first embodiment will be explained with reference to FIG. 2 to FIG. 4.

Figure 2:
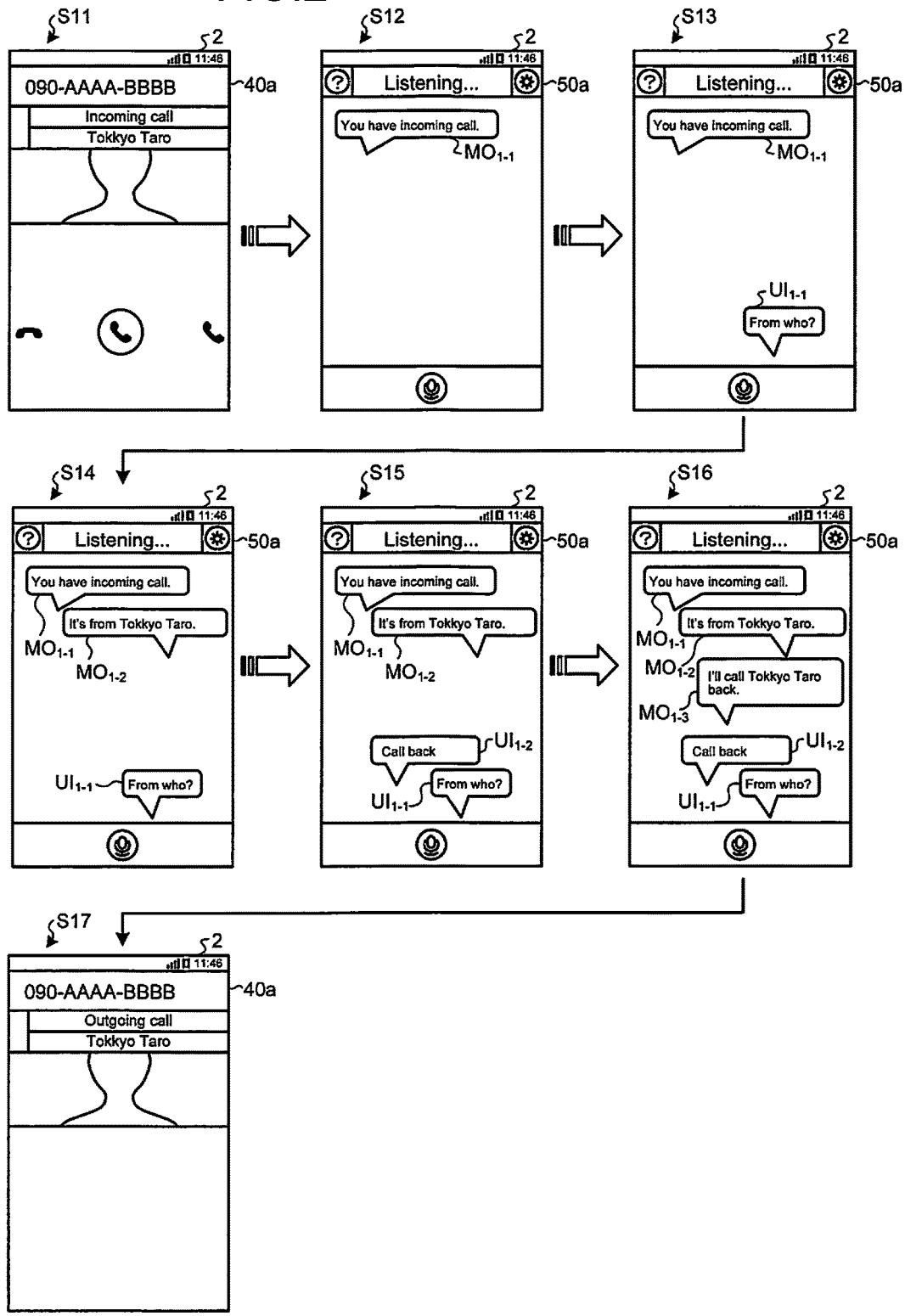
FIG. 2 is a diagram of one of examples of control performed by the smartphone when a missed call occurs on the phone.

FIG. 2 is a diagram of one of examples of the control performed by the smartphone 1 when a missed call occurs on the phone. As illustrated in FIG. 2, when receiving an incoming call, the smartphone 1 displays a screen 40a for notifying the user of the incoming call on the display 2 (Step S11). When the incoming call is not responded and therefore becomes a missed call (Step S11), the smartphone 1 activates the voice input by the user through the microphone 8 (Step S12). When the voice input by the user is activated, the smartphone 1 may display a screen 50a indicating that the voice input is in the active state on the display 2. The smartphone 1 may display a balloon image $MO_{1-1}$ indicating reception of an incoming call on the screen 50a. When the balloon image $MO_{1-1}$ indicating reception of an incoming call is displayed, the smartphone 1 may generate a reading voice indicating reception of the incoming call and output the generated reading voice from the speaker 11.

Subsequently, when the user's voice is input through the microphone 8 (Step S13), the smartphone 1 performs recognition processing on the input voice and performs processing according to the result of the recognition processing (Step S14 to Step S17).

For example, when it is recognized that the content of the voice is an inquiry about a caller of the missed call as a result of the recognition processing performed on the input voice (Step S13), the smartphone 1 acquires information for a name of the caller corresponding to the missed call. As illustrated at Step S13 to Step S16, the smartphone 1 may display a balloon image $UI_{1-1}$ corresponding to the content of the input voice (for example, "From who?") on the screen 50a.

Subsequently, the smartphone 1 generates a reading voice corresponding to the name of the caller corresponding to the missed call and outputs the generated reading voice from the speaker 11 (Step S14). As illustrated at Step S14 to Step S16, the smartphone 1 may display a balloon image $MO_{1-2}$ corresponding to the generated reading voice (for example, "It's from Tokkyo Taro.") on the screen 50a.

For example, when a state with no voice input is continued for a given period of time after the voice input is activated, the smartphone 1 changes the voice input from the active state to the inactive state, and times out the voice input. Meanwhile, when the state with no voice input is not continued for a given period of time, the smartphone 1 continues the recognition processing of the input voice without timing out the voice input.

When it is recognized that the content of the voice is an instruction of a call-back to the telephone number corresponding to the missed call as a result of the recognition processing performed on the voice input subsequently to Step S13 (Step S15), the smartphone 1 generates a reading voice indicating that the call-back will be made and outputs the generated reading voice from the speaker 11 (Step S16). Subsequently, the smartphone 1 performs outgoing call processing to the telephone number corresponding to the missed call (Step S17). As illustrated at Step S15 and Step S16, the smartphone 1 may display, for example, a balloon image $UI_{1-2}$ corresponding to the content of the input voice (for example, "Call back") on the screen 50a. As illustrated at Step S16, the smartphone 1 may display, for example, a balloon image $MO_{1-3}$ corresponding to a reading voice indicating that the call-back will be made (for example, "I'll call Tokkyo Taro back") on the screen 50a.

In the example of the control illustrated in FIG. 2, when it is determined that the smartphone 1 is inserted in a user's pocket or the like, through the illumination sensor 4 or the proximity sensor 5, the smartphone 1 does not have to display the balloon. This is because the user cannot check the smartphone 1 even if the balloon is displayed.

In the example of the control illustrated in FIG. 2, when it is determined that the smartphone 1 is inserted in the user's pocket or the like, through the illumination sensor 4 or the proximity sensor 5, the smartphone 1 does not have to activate the voice input. This is because the user's voice cannot be accurately input through the microphone 8 even if the voice input is activated.

In the example of the control illustrated in FIG. 2, even if it is determined that the smartphone 1 is inserted in the user's pocket or the like, through the illumination sensor 4 or the proximity sensor 5, the smartphone 1 may activate the voice input if a connection of a headset capable of the voice input is detected. This is because the voice from the user can be input from the headset even if the user's voice cannot be accurately input through the microphone 8. The handset is one of examples of sound output modules.

In the example of the control illustrated in FIG. 2, when the content of the input voice is an inquiry or an instruction from the user, the smartphone 1 may output a response according to the inquiry or to the instruction from the user as a reading voice each time. Even if the content of the input voice is an inquiry or an instruction from the user, the smartphone 1 may determine whether to output a response according to the content of an input voice instead of outputting a response as a reading voice each time. For example, as illustrated at Step S16 of FIG. 12, the smartphone 1 may first output a reading voice such as "I'll call Tokkyo Taro back" in response to the instruction of the call-back from the user, and then perform outgoing call processing to the telephone number corresponding to the missed call. Meanwhile, when the instruction of the call-back from the user can be recognized, the smartphone 1 may directly perform the outgoing call processing to the telephone number corresponding to the missed call without outputting the reading voice responding to the instruction of the call-back. At least as far as exchange between the user and the smartphone 1 can be smoothly performed, the smartphone 1 may arbitrarily perform the exchange of voice with the user.

Figure 3:
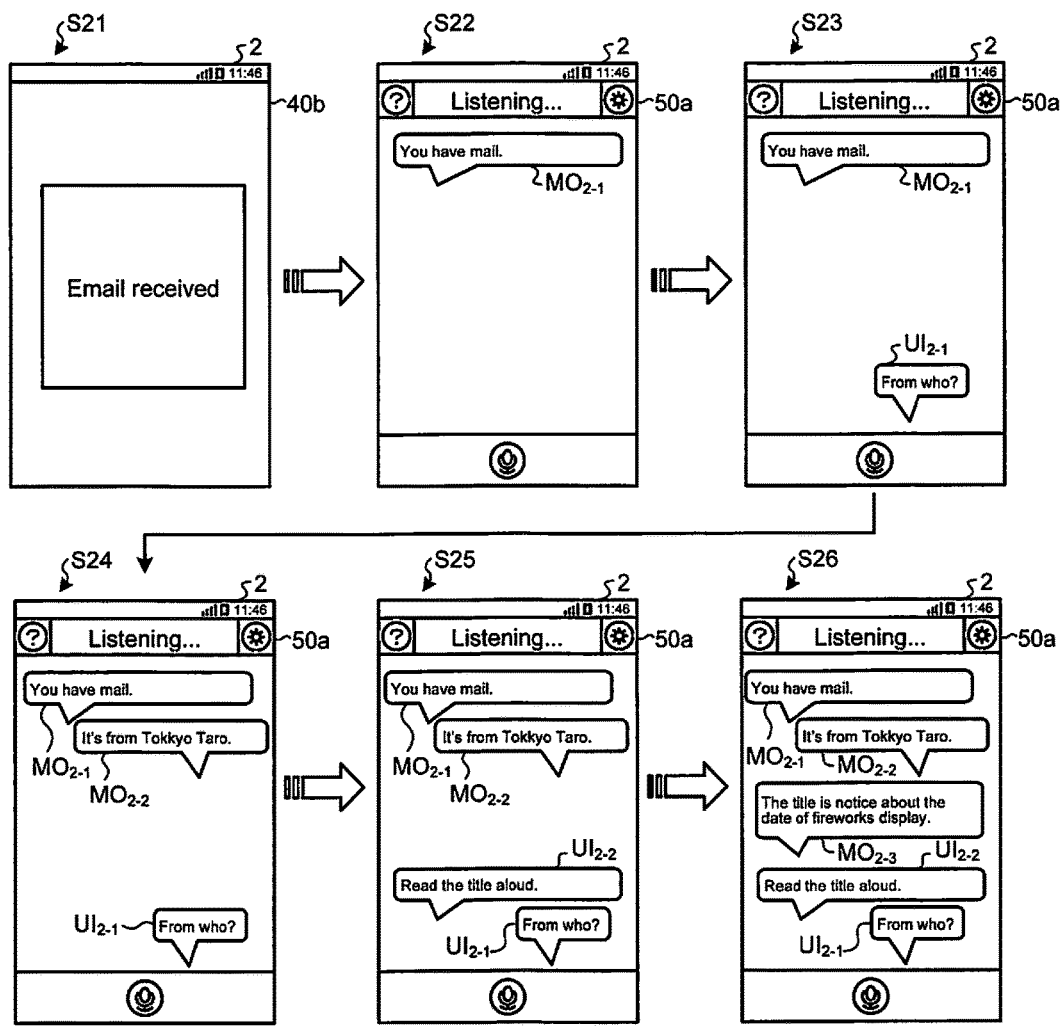
FIG. 3 is a diagram of one of examples of control performed by the smartphone when an email is received.

FIG. 3 is a diagram of one of examples of control performed by the smartphone 1 when an email is received. As illustrated in FIG. 3, when receiving a mail, the smartphone 1 displays a screen 40b for notifying the user of mail reception on the display (Step S21). When receiving the mail, the smartphone 1 activates the voice input by the user through the microphone 8 (Step S22). When the voice input by the user is activated, the smartphone 1 may display the screen 50a indicating that the voice input is in the active state on the display 2. The smartphone 1 may display a balloon image $MO_{2-1}$ indicating reception of the mail on the screen 50a. When the balloon image $MO_{2-1}$ indicating reception of the mail is displayed, the smartphone 1 may generate a reading voice indicating the mail reception and output the generated reading voice from the speaker 11.

Subsequently, when the user's voice is input through the microphone 8 (Step S23), the smartphone 1 performs the recognition processing on the input voice and performs processing according to the result of the recognition processing (Step S24 to Step S26).

For example, when it is recognized that the content of the voice is an inquiry about a sender (submitter) of the received mail as a result of the recognition processing performed on the input voice (Step S23), the smartphone 1 acquires information for a name of the sender of the received mail. As illustrated at Step S23 to Step S26, the smartphone 1 may display a balloon image $UI_{2-1}$ indicating the content of the input voice (for example, "From who?") on the screen 50a.

Subsequently, the smartphone 1 generates a reading voice corresponding to the name of the sender of the received mail and outputs the generated reading voice from the speaker 11 (Step S24). As illustrated at Step S24 to Step S26, the smartphone 1 may display a balloon image $MO_{2-2}$ corresponding to the generated reading voice (for example, "It's from Tokkyo Taro.") on the screen 50a.

For example, when the state with no voice input is continued for a given period of time after the voice input is activated, the smartphone 1 changes the voice input from the active state to the inactive state, and times out the voice input. Meanwhile, when the state with no voice input is not continued for a given period of time, the smartphone 1 continues the recognition processing of the input voice without timing out the voice input.

When it is recognized that the content of the voice is an inquiry about a title (subject) of the received mail as a result of the recognition processing performed on the voice input subsequently to Step S23 (Step S25), the smartphone 1 generates a reading voice corresponding to the title of the received mail and outputs the generated reading voice from the speaker 11 (Step S26). As illustrated at Step S25 and Step S26, the smartphone 1 may display a balloon image $UI_{2-2}$ indicating the content of the input voice (for example, "Read the title aloud") on the screen 50a. As illustrated at Step S26, the smartphone 1 may display a balloon image $MO_{2-3}$ corresponding to the reading voice corresponding to the title of the received mail (for example, "The title is notice about the date of fireworks display.") on the screen 50a.

Figure 4:
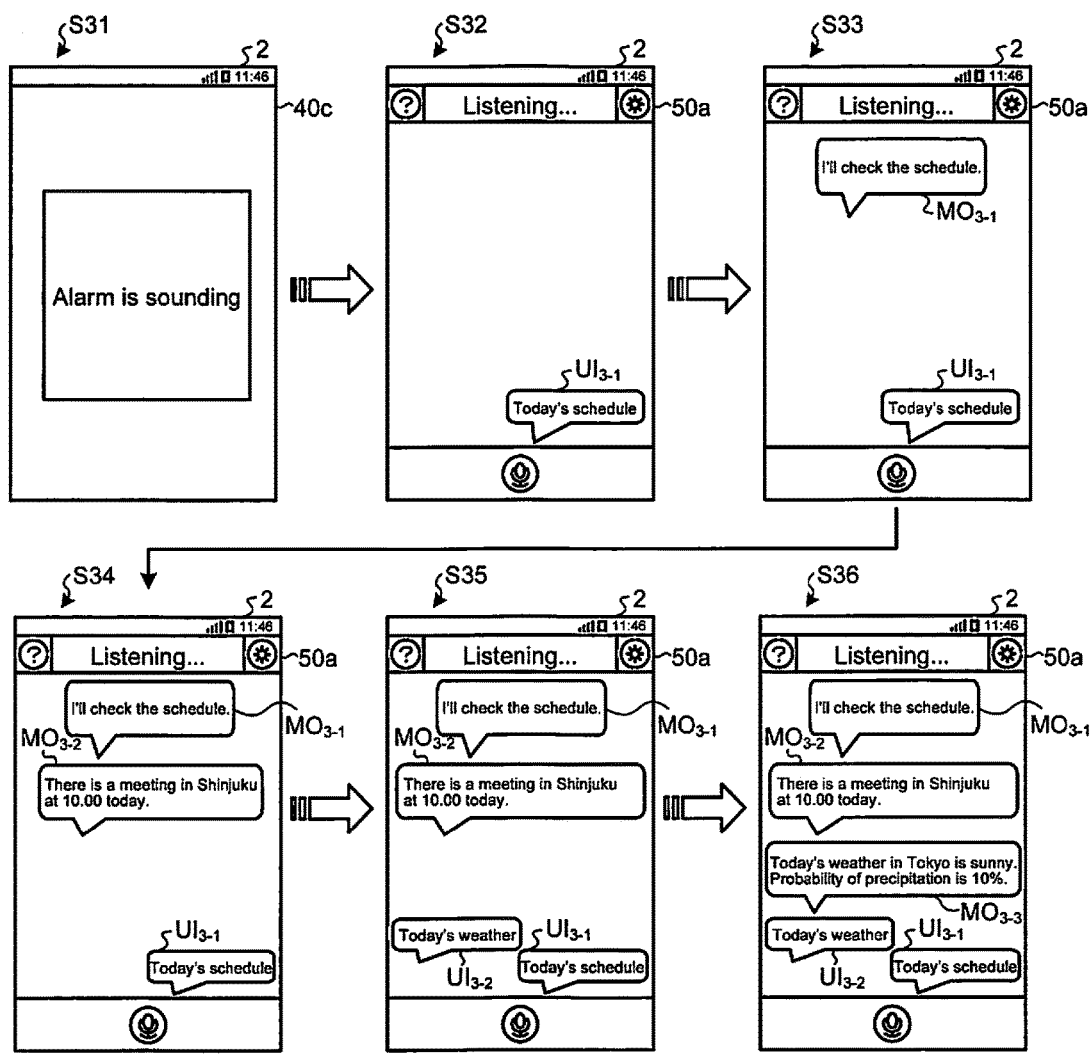
FIG. 4 is a diagram of one of examples of control performed by the smartphone when an alarm sounds.

FIG. 4 is a diagram of one of examples of the control performed by the smartphone 1 when an alarm sounds. As illustrated in FIG. 4, when detecting that it reaches a sounding time of alarm, the smartphone 1 sounds the alarm and displays a screen 40c for notifying the user that the alarm is sounding on the display 2 (Step S31). When the alarm sounds, the smartphone 1 activates the voice input by the user through the microphone 8 (Step S32). When the voice input by the user is activated, the smartphone 1 may display the screen 50a indicating that the voice input is in the active state on the display 2. The smartphone 1 may display a balloon image indicating alarm sounding on the screen 50a.

Subsequently, when the user's voice is input through the microphone 8 (Step S32), the smartphone 1 performs the recognition processing on the input voice and performs processing according to the result of the recognition processing (Step S33 to Step S36).

For example, when it is recognized that the content of the voice is an inquiry about today's schedule as a result of the recognition processing performed on the input voice (Step S32), the smartphone 1 generates a reading voice for responding to the inquiry and outputs the generated reading voice from the speaker 11 (Step S33). As illustrated at Step S32 to Step S36, the smartphone 1 may display a balloon image $UI_{3-1}$ corresponding to the content of the input voice (for example, "Today's schedule") on the screen 50a. As illustrated at Step S33 to Step S36, the smartphone 1 may display a balloon image $MO_{3-1}$ corresponding to the reading voice for responding to the inquiry about the schedule (for example, "I'll check the schedule") on the screen 50a. After the response to the user, the smartphone 1 acquires information related to the today's schedule.

Subsequently, the smartphone 1 generates a reading voice corresponding to the today's schedule and outputs the generated reading voice from the speaker 11 (Step S34). As illustrated at Step S34 to Step S36, the smartphone 1 may display a balloon image $MO_{3-2}$ corresponding to the generated reading voice (for example, "There is a meeting in Shinjuku at 10.00 today.") on the screen 50a.

For example, when the state with no voice input is continued for a given period of time after the voice input is activated, the smartphone 1 changes the voice input from the active state to the inactive state, and times out the voice input. Meanwhile, when the state with no voice input is not continued for a given period of time, the smartphone 1 continues the recognition processing of the input voice without timing out the voice input.

When it is recognized that the content of the voice is an inquiry about today's weather as a result of the recognition processing performed on the voice input subsequently to Step S32 (Step S35), the smartphone 1 acquires information related to the today's weather. Subsequently, the smartphone 1 generates a reading voice corresponding to the acquired information related to the today's weather, and outputs the generated reading voice (Step S36). As illustrated at Step S35 and Step S36, the smartphone 1 may display a balloon image $UI_{3-2}$ corresponding to the content of the input voice (for example, "Today's weather") on the screen 50a. As illustrated at Step S36, the smartphone 1 may display a balloon image $MO_{3-3}$ corresponding to the generated reading voice (for example, "Today's weather in Tokyo is sunny. Probability of precipitation is 10%.") on the screen 50a.

FIG. 5 is a diagram of one of examples of a processing procedure for implementing the control based on a function provided by the control program 9A according to the first embodiment. The processing procedure illustrated in FIG. 5 is implemented by the controller 10 executing the control program 9A. The processing procedure illustrated in FIG. 5 is repeatedly performed while the smartphone 1 operates.

As illustrated in FIG. 5, for example, at Step S101, the controller 10 determines whether an event to be notified to the user has occurred. Examples of the event include, but are not limited to, a missed call on the phone, reception of a mail, and alarm sounding. When it is determined that no event to be notified to the user has occurred (No at Step S101), the controller 10 ends the processing procedure illustrated in FIG. 5.

When it is determined that an event to be notified to the user has occurred (Yes at Step S101), the controller 10 determines whether the smartphone 1 is inserted in the user's pocket or the like (Step 102). When it is determined that the smartphone 1 is inserted in the user's pocket or the like (Yes at Step 102) the controller 10 determines whether the smartphone 1 is connected to a headset (Step 103). When it is determined that the smartphone 1 is not inserted in the user's pocket or the like (No at Step 103) the controller 10 changes the voice input from the active state to the inactive state (Step S107). Meanwhile, when it is determined that the smartphone 1 is inserted in the user's pocket or the like (Yes at Step 103), the controller 10 changes the voice input through the microphone 8 from the inactive state to the active state (Step S104). Subsequently, the controller 10 performs the recognition processing on the voice input through the microphone 8, and performs processing according to the recognition result (Step S105). For example, when the content of the input voice is an inquiry about a caller of the missed call as a result of voice recognition, the controller 10 outputs a reading voice corresponding to a name of the caller of the missed call. For example, when the content of the input voice is an instruction of a call-back to the telephone number corresponding to the missed call as a result of voice recognition, the controller 10 makes dialing to the telephone number corresponding to the missed call. For example, when the content of the input voice is an inquiry about a sender of a received mail as a result of voice recognition, the controller 10 outputs a reading voice corresponding to a name of the sender of the received mail. For example, when the content of the input voice is an inquiry about a title (subject) of the received mail as a result of voice recognition, the controller 10 outputs a reading voice corresponding to the title of the received mail. For example, when the content of the input voice is an inquiry about today's schedule as a result of voice recognition, the controller 10 outputs a reading voice for responding to the inquiry about the schedule. For example, when the content of the input voice is an inquiry about today's weather as a result of voice recognition, the controller 10 outputs a reading voice corresponding to information related to the weather. When it is determined that the smartphone 1 is not inserted in the user's pocket or the like (No at Step 102) the controller 10 moves to the processing procedure at Step S104.

Subsequently, the controller 10 determines whether the state with no voice input is continued for a given period of time (Step S106). When it is determined that the state with no voice input is not continued for a given period of time (No at Step S106), the controller 10 returns to the processing procedure at Step S105, and continues the recognition processing of the input voice.

Meanwhile, when it is determined that the state with no voice input is continued for a given period of time (Yes at Step S106), the controller 10 changes the voice input from the active state to the inactive state (Step S107), and ends the processing procedure illustrated in FIG. 5.

As explained above, in the first embodiment, when detecting occurrence of the event to be notified to the user, the smartphone 1 controls the voice input by the user through the microphone 8 to be activated. Therefore, in the first embodiment, the user can perform an inquiry about an event and/or an operation input according to the event using the voice input, and the convenience of the user when performing an operation according to any of the various events can thereby be improved.

In the first embodiment, for example, a missed call on the phone, reception of a mail, and alarm sounding are exemplified as the event; however, besides these examples, reaching a predetermined value of remaining battery level, start or end of charge, detection of an access point in wireless LAN, area detection, and the like may be included in examples of the event. The event is a timing for activating the voice input, which can be arbitrarily set. When the remaining battery level reaches the predetermined value, the smartphone 1 controls the voice input to be activated. When the charge is started, the smartphone 1 controls the voice input to be activated. When the charge is ended, the smartphone 1 controls the voice input to be activated. When the access point of the wireless LAN is detected, the smartphone 1 controls the voice input to be activated. When a specific area is detected based on a radio signal from a GPS satellite, the smartphone 1 controls the voice input to be activated.

In the first embodiment, when performing the recognition processing on the input voice, the smartphone 1 may perform processing of notifying the user of the numbers of missed calls and of received mails, outgoing call processing to answering machine service, approval processing to attend meeting, setting processing and canceling processing of silent mode, or the like. That is, the smartphone 1 may implement all the processing that the user can manually execute, using the voice input.

In the first embodiment, when the state with no voice input is continued for the given period of time, the smartphone 1 changes the voice input from the active state to the inactive state, and times out the voice input. Therefore, according to the first embodiment, it is possible to reduce the possibility of occurrence of an erroneous operation due to the voice input.

In the embodiment, the smartphone 1 performs the recognition processing on the voice input by the user through the microphone 8 and performs processing according to the recognition result. Therefore, according to the first embodiment, it is possible to improve the convenience of the user without the need for the user to manually perform an operation input when the processing according to any of the various events is to be performed.

In the first embodiment, the smartphone 1 notifies the user of the content of the processing performed according to the result of voice recognition with a reading voice or with a balloon image. Therefore, according to the first embodiment, it is possible to let the user know whether the voice input is correctly accepted by the smartphone 1.

Second Embodiment

In the first embodiment, when the above-mentioned event occurs in a security lock state, the smartphone 1 may control the voice input not to be activated. FIG. 6 is a diagram of one of examples of a processing procedure for implementing the control based on a function provided by the control program 9A according to a second embodiment. The processing procedure illustrated in FIG. 6 is implemented by the controller 10 executing the control program 9A. The processing procedure illustrated in FIG. 6 is repeatedly executed while the smartphone 1 operates. In the processing procedure illustrated in FIG. 6, the procedure at Step S202 is different from the processing procedure illustrated in FIG. 5.

The control program 9A includes a function for causing the controller 10 to control not to activate the voice input when the above-mentioned event occurs in the security lock state.

The controller 10 performs the control program 9A, to thereby implement the processing for controlling not to activate the voice input when the above-mentioned event occurs in the security lock state.

As illustrated in FIG. 6, for example, at Step S201, the controller 10 determines whether an event to be notified to the user has occurred. Examples of the event include, but are not limited to, a missed call on the phone, reception of a mail, and alarm sounding. When it is determined that the event has not occurred (No at Step S201), the controller 10 ends the processing procedure illustrated in FIG. 6.

When it is determined that an event to be notified to the user has occurred (Yes at Step S201), the controller 10 determines whether the smartphone 1 is in the security lock state (Step S202). The security lock state is a state in which operations performed on the smartphone 1 are invalidated. The user can cancel the security lock by inputting a predetermined password or the like.

When it is determined that the smartphone 1 is in the security lock state (Yes at Step S202), the controller 10 ends the processing procedure illustrated in FIG. 6. In other words, when the smartphone 1 is in the security lock state, it is assumed that the user is not using the smartphone 1, and therefore it is considered that there is less need to activate the voice input.

Meanwhile, when it is determined that the smartphone 1 is not in the security lock state (No at Step S202), the controller 10 changes the voice input through the microphone 8 from the inactive state to the active state (Step S203). Subsequently, the controller 10 performs the recognition processing on the voice input through the microphone 8, and performs processing according to the recognition result (Step S204). For example, when the content of the input voice is an inquiry about a caller of the missed call as a result of voice recognition, the controller 10 outputs a reading voice corresponding to a name of the caller of the missed call. For example, when the content of the input voice is an instruction of a call-back to the telephone number corresponding to the missed call as a result of voice recognition, the controller 10 makes dialing to the telephone number corresponding to the missed call. For example, when the content of the input voice is an inquiry about a sender of a received mail as a result of voice recognition, the controller 10 outputs a reading voice corresponding to a name of the sender of the received mail. For example, when the content of the input voice is an inquiry about a title (subject) of the received mail as a result of voice recognition, the controller 10 outputs a reading voice corresponding to the title of the received mail. For example, when the content of the input voice is an inquiry about today's schedule as a result of voice recognition, the controller 10 outputs a reading voice for responding to the inquiry about the schedule. For example, when the content of the input voice is an inquiry about today's weather as a result of voice recognition, the controller 10 outputs a reading voice corresponding to information related to the weather.

Subsequently, the controller 10 determines whether the state with no voice input is continued for a given period of time (Step S205). When it is determined that the state with no voice input is not continued for a given period of time (No at Step S205), the controller 10 returns to the processing procedure at Step S204, and continues the recognition processing of the input voice.

Meanwhile, when it is determined that the state with no voice input is continued for a given period of time (Yes at Step S205), the controller 10 changes the voice input from the active state to the inactive state (Step S206), and ends the processing procedure illustrated in FIG. 6.

Other Embodiments

For example, when the voice input is activated in response to the occurrence of an event and then another event occurs, or when a plurality of events occur substantially simultaneously, the smartphone 1 may perform processing corresponding to each event.

FIG. 7 is a diagram of one of examples of control performed by the smartphone 1 when a missed call occurs immediately after reception of a mail.

As illustrated in FIG. 7, for example, when an incoming call immediately after reception of a mail becomes a missed call (Step S41), the smartphone 1 activates the voice input by the user through the microphone 8 by the reception of the mail before the missed call (Step S42). When the voice input by the user is activated, the smartphone 1 may display the screen 50a indicating that the voice input is in the active state on the display 2. The smartphone 1 may display a balloon image $MO_{4-1}$ indicating reception of the incoming call and a balloon image $MO_{4-2}$ indicating reception of the mail on the screen 50a. When the balloon image $MO_{4-1}$ indicating reception of the incoming call and the balloon image $MO_{4-2}$ indicating reception of the mail are displayed, the smartphone 1 may generate reading voices corresponding to the respective balloons and output respectively the generated reading voices from the speaker 11.

Subsequently, when the user's voice is input through the microphone 8 (Step S43), the smartphone 1 performs the recognition processing on the input voice and performs processing according to the result of the recognition processing (Step S44 to Step S48).

For example, when it is recognized that the content of the voice is an inquiry about a caller of the missed call as a result of the recognition processing performed on the input voice (Step S43), the smartphone 1 acquires information for a name of the caller of the missed call. As illustrated at Step S43 to Step S46, the smartphone 1 may display a balloon image $UI_{4-1}$ corresponding to the content of the input voice (for example, "Who called me up?") on the screen 50a.

Subsequently, the smartphone 1 generates a reading voice corresponding to the name of the caller corresponding to the missed call and outputs the generated reading voice from the speaker 11 (Step S44). As illustrated at Step S44 to Step S46, the smartphone 1 may display a balloon image $MO_{4-3}$ corresponding to the generated reading voice (for example, "The incoming call is from Tokkyo Taro.") on the screen 50a.

For example, when the state with no voice input is continued for a given period of time after the voice input is activated, the smartphone 1 changes the voice input from the active state to the inactive state, and times out the voice input. Meanwhile, when the state with no voice input is not continued for a given period of time, the smartphone 1 continues the recognition processing of the input voice without timing out the voice input.

When it is recognized that the content of the voice is an inquiry about a sender (submitter) of the received mail as a result of the recognition processing performed on the voice input subsequently to Step S43 (Step S45), the smartphone 1 acquires information for a name of the sender of the received mail. As illustrated at Step S45 and Step S46, the smartphone 1 may display a balloon image $UI_{4-2}$ indicating the content of the input voice (for example, "Who emailed me?") on the screen 50a.

Subsequently, the smartphone 1 generates a reading voice corresponding to the name of the sender of the received mail and outputs the generated reading voice from the speaker 11 (Step S46). As illustrated at Step S46, the smartphone 1 may display a balloon image $MO_{4-4}$ corresponding to the generated reading voice (for example, "The mail is from Tokkyo Hanako.") on the screen 50a.

When it is recognized that the content of the voice is an instruction of a call-back to the telephone number corresponding to the missed call as a result of the recognition processing performed on the voice input subsequently to Step S45 (Step S47), the smartphone 1 generates a reading voice indicating that the call-back will be made and outputs the generated reading voice from the speaker 11 (Step S48). Subsequently, the smartphone 1 performs outgoing call processing to the telephone number corresponding to the missed call (Step S49). As illustrated at Step S47 and Step S48, the smartphone 1 may display, for example, a balloon image $UI_{4-3}$ corresponding to the content of the input voice (for example, "Call back") on the screen 50a. At this time, if there is no space to display the balloon image $UI_{4-3}$ in the screen 50a, for example, the smartphone 1 may delete the currently displaying balloon images to display the balloon image $UI_{4-3}$, as illustrated at Step S47. As illustrated at Step S48, the smartphone 1 may display, for example, a balloon image $MO_{4-5}$ corresponding to the reading voice indicating that the call-back will be performed (for example, "I'll call Tokkyo Taro back.") on the screen 50a.

Although the art of appended claims has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

For example, each of the programs illustrated in FIG. 1 may be divided into a plurality of modules. Alternatively, each of the programs illustrated in FIG. 1 may be integrated with other program.

In above embodiments, the smartphone is explained as one of examples of the electronic device according to the present application; however, the device according to the appended claims is not limited to the smartphone. The device according to the appended claims may be any electronic device other than the smartphone. Examples of the electronic device include, but are not limited to, mobile phones, tablets, mobile personal computers, digital cameras, media players, electronic book readers, navigators, and gaming devices. Alternatively, the device according to the appended claims may be a stationary-type electronic device. Examples of the stationary-type electronic device include, but are not limited to, desktop personal computers and television receivers.

The invention claimed is:

1. An electronic device, comprising:
a sound input module configured to input a voice input;
an illumination sensor;
a proximity sensor; and
a controller configured to control the voice input to an active state when detecting occurrence of an event to be notified to a user, wherein
the controller is configured to control the voice input to an inactive state based on a state of the electronic device determined through the illumination sensor or the proximity sensor, and
the controller is further configured to,
when detecting that a headset configured to input a voice input is connected to the electronic device,
control the voice input through the headset to an active state, regardless of the state of the electronic device determined through the illumination sensor or the proximity sensor.

2. The electronic device according to claim 1, wherein the controller is configured to control the voice input from the active state to the inactive state when a state with no voice input to the sound input module is continued for a given period of time.

3. The electronic device according to claim 1, wherein the controller is configured to maintain the voice input in the inactive state when detecting the occurrence of the event in a security lock state.

4. The electronic device according to claim 1, wherein the controller is configured to
perform a voice recognition processing on the voice input, and
perform a processing according to a result of the voice recognition processing.

5. The electronic device according to claim 4, wherein the controller is configured to notify the user of a content of the processing performed according to the result of the voice recognition processing.

6. A control method for controlling an electronic device with a sound input module configured to input a voice input, an illumination sensor, and a proximity sensor, the control method comprising:
detecting occurrence of an event to be notified to a user;
controlling the voice input to an active state when the occurrence of the event is detected;
controlling the voice input to an inactive state based on a state of the electronic device determined through the illumination sensor or the proximity sensor; and
when detecting that a headset configured to input a voice input is connected to the electronic device,
controlling the voice input through the headset to an active state, regardless of the state of the electronic device determined through the illumination sensor or the proximity sensor.

7. A non-transitory storage medium that stores a control program that causes, when executed by an electronic device with a sound input module configured to input a voice input, an illumination sensor, and a proximity sensor, the electronic device to execute:
detecting occurrence of an event to be notified to a user;
controlling the voice input to an active state when the occurrence of the event is detected;
controlling the voice input to an inactive state based on a state of the electronic device determined through the illumination sensor or the proximity sensor; and
when detecting that a headset configured to input a voice input is connected to the electronic device,
controlling the voice input through the headset to an active state, regardless of the state of the electronic device determined through the illumination sensor or the proximity sensor.

* * * * *